United States Patent
Schramm et al.

(10) Patent No.: US 8,375,234 B2
(45) Date of Patent: Feb. 12, 2013

(54) WAKEUP OF A NON-POWERED UNIVERSAL SERIAL BUS

(75) Inventors: Michal Schramm, Tel Aviv (IL); Ziv Hershman, Givat Shmuel (IL); Yehezkel Friedman, Ramat Hasharon (IL); Zeev Heller, Ganei Tikva (IL)

(73) Assignee: Winbond Electronics Corporation, Hsinchu (TW)

( * ) Notice: Subject to any disclaimer, the term of this patent is extended or adjusted under 35 U.S.C. 154(b) by 1213 days.

(21) Appl. No.: 12/033,433

(22) Filed: Feb. 19, 2008

(65) Prior Publication Data

US 2009/0210734 A1 Aug. 20, 2009

(51) Int. Cl.
G06F 1/00 (2006.01)
G06F 1/26 (2006.01)
G06F 1/32 (2006.01)

(52) U.S. Cl. .................... 713/324; 713/300; 713/310

(58) Field of Classification Search .................. 713/300, 713/310, 320, 323, 324
See application file for complete search history.

(56) References Cited

U.S. PATENT DOCUMENTS

| | | | |
|---|---|---|---|
| 5,767,844 A | 6/1998 | Stoye | |
| 5,799,196 A | 8/1998 | Flannery | |
| 6,622,178 B1 | 9/2003 | Burke et al. | |
| 6,963,984 B2 | 11/2005 | Shiga | |
| 7,072,989 B1 | 7/2006 | Kolokowsky et al. | |
| 2001/0009027 A1 | 7/2001 | Shiga | |
| 2001/0027530 A1 | 10/2001 | Yen et al. | |
| 2002/0147876 A1 | 10/2002 | Croyle | |
| 2003/0014676 A1 | 1/2003 | Wang et al. | |
| 2003/0014677 A1* | 1/2003 | Howard et al. | 713/323 |
| 2005/0027889 A1 | 2/2005 | Sandulescu | |
| 2005/0160196 A1* | 7/2005 | Dutton et al. | 710/10 |
| 2006/0129855 A1 | 6/2006 | Rhoten et al. | |
| 2006/0190748 A1 | 8/2006 | Lim et al. | |
| 2007/0140199 A1* | 6/2007 | Zhao et al. | 370/338 |
| 2007/0260783 A1* | 11/2007 | Combs et al. | 710/62 |
| 2008/0222431 A1* | 9/2008 | Paniagua et al. | 713/300 |
| 2008/0307140 A1* | 12/2008 | Goldstein et al. | 710/260 |
| 2009/0153189 A1* | 6/2009 | Kirk et al. | 326/46 |

OTHER PUBLICATIONS

"PCI Local Bus Specification;" Revision 2.2; Dec. 18, 1998.
"PCI Local Bus Specification;" Revision 2.3; Oct. 31, 2001.

* cited by examiner

Primary Examiner — Kim Huynh
Assistant Examiner — Brandon Kinsey
(74) Attorney, Agent, or Firm — Oliff & Berridge, PLC

(57) ABSTRACT

Universal serial bus wakeup when the bus is not powered. In one embodiment, a method of waking up a universal serial bus (USB) from a non-powered state, comprises: upon detection of a wakeup condition, a wakeup generation module associated with a USB device generating a wakeup signal on a power line of a USB bus coupled to the USB device, or on a single-wire sideband; and a host wakeup module detecting the wakeup signal and causing the USB bus that is coupled to the USB device to be supplied with power.

20 Claims, 8 Drawing Sheets

WAKEUP OF A NON-POWERED UNIVERSAL SERIAL BUS

FIELD OF THE INVENTION

This invention relates to Universal Serial Buses.

BACKGROUND OF THE INVENTION

The Universal Serial Bus (USB) standard was originally designed to support personal computer to telephone interconnect, ease of use and port expansion for a personal computer. Port expansion includes peripherals such as a mouse, keyboard, monitor, printer, scanner, modem, etc. Today however, electronic systems other than personal computers may also include a Universal Serial Bus to facilitate connections. Although most USB devices today are still peripheral devices, a motherboard or an equivalent, or an expansion card may in some cases include USB devices.

In order to enhance readability herein, a bus which is a Universal Serial Bus will also be referred to herein below as a USB bus in order to emphasize that the bus is being indicated, even though the term may be considered by some to be repetitive because the word "bus" is included in the acronym. Under the current USB standard, four wires are included in the USB bus: a power line (e.g. Vbus), a ground connection, and a pair of differential data leads (lines), denoted D+ and D− on which USB signals are transferred.

SUMMARY OF THE INVENTION

According to the present invention, there is provided a method of waking up a USB bus from a non-powered state, comprising: upon detection of a wakeup condition, a wakeup generation module associated with a USB device generating a wakeup signal on a power line of a USB bus coupled to the USB device, and a host wakeup module detecting the wakeup signal and causing the USB bus that is coupled to the USB device to be supplied with power.

According to the present invention, there is also provided a method of waking up a USB bus from a non-powered state, comprising: upon detection of a wakeup condition, a wakeup generation module associated with a USB device generating a wakeup signal on a single-wire sideband; and a host wakeup module detecting the wakeup signal and causing a USB bus that is coupled to the USB device to be supplied with power.

According to the present invention, there is further provided a module for waking up a USB bus which is not powered, comprising: a wakeup generation module, associated with a USB device, configured upon detection of a wakeup condition, to generate a wakeup signal on a power line of a USB bus coupled to the associated USB device; wherein the wakeup signal when detected causes the USB bus to be supplied with power.

According to the present invention, there is provided a module for waking up a USB bus which is not powered, comprising: a wakeup generation module, associated with a USB device, configured upon detection of a wakeup condition to generate a wakeup signal on a single-wire sideband; wherein the wakeup signal when detected causes a USE bus coupled to the associated USB device to be supplied with power.

According to the present invention, there is also provided a host with wakeup capabilities, comprising: a USB power supply configured to supply or not supply power to a USE bus; and a host wakeup module, coupled to a power line of the USB bus, configured to detect a wakeup signal on the power line and configured to subsequently enable the USB power supply to supply power to the USB bus.

According to the present invention, there is further provided a host with wakeup capabilities, comprising: a USB power supply configured to supply or not supply power to a USB bus; and a host wakeup module configured to detect a wakeup signal on a single-wire sideband and configured to subsequently enable the USB power supply to supply power to the USB bus.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS

Figure 1:
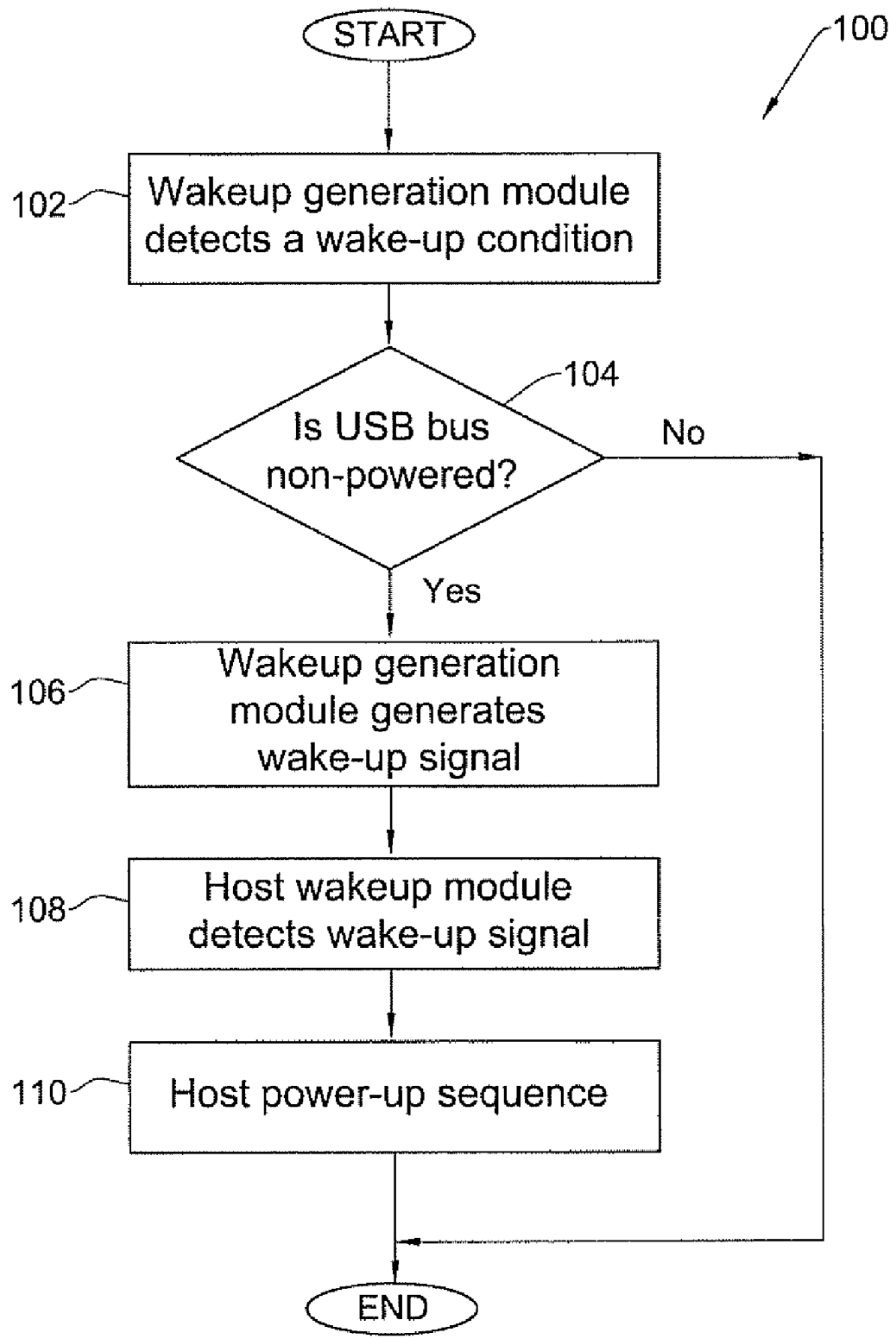
FIG. 1 is a flowchart of a method of wakeup when the USB bus is not powered, according to an embodiment of the present invention.

Described herein are embodiments in which a wakeup generation module, associated with a USB device, wakes up a USB bus which is coupled to the associated USB device from a non-powered state. For example, the USB bus which is woken up may be coupled to the upstream port of the associated USB device. Herein, a USB bus is termed "non-powered", "not powered", "unpowered", "in a non-powered state", or variants thereof when all USB device(s) coupled thereto are in the "attached" device state, the USB bus is termed "active", "in an active state", or variants thereof when all USB device(s) coupled thereto are in any of the following device states: "powered", "default", address" or "configured", and the USB bus is termed "suspended, "in a suspended state", "in suspension", or variants thereof, when all USB device(s) coupled thereto are in the "suspended" device state. In various embodiments, the wakeup generation module may be within the associated USB device, external to the associated USB device, or partially within and partially external to the associated USB device, and therefore the term "associated USB device", "associated wakeup generation module" or variants thereof should be understood to connote any of these embodiments as appropriate. In various embodiments, the wakeup generation module may generate a wakeup signal on a power line of the USB bus (e.g. Vbus) and/or may generate a wakeup signal on a single-wire sideband. In embodiments with the wakeup signal on the power line of the USB bus, the power line is routed to a host wakeup module. In embodiments with the wakeup signal on a single-wire sideband, the wakeup signal is communicated to a host wakeup module via a wire that is not one of the four wires (Vbus, ground, D+, D−) included in the USB bus under the current USB standard.

As used herein, the phrase "for example," "such as" and variants thereof describe non-limiting embodiments of the present invention.

Unless defined otherwise, all technical and scientific terms used herein have the same meaning as commonly understood by one of ordinary skill in the art to which this invention belongs. Generally (although not necessarily), the nomenclature used herein described below are well known and commonly employed in the art.

Reference in the specification to "one embodiment", "an embodiment", "some embodiments", "another embodiment", "other embodiments" or variants thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments" or variations thereof does not necessarily refer to the same embodiment(s).

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Unless specifically stated otherwise, as apparent from the following discussions, it is appreciated that throughout the specification discussions, utilizing terms such as, "processing", "waking", "computing", "detecting", "calculating", "measuring", "determining", "communicating", "realizing", "applying", "generating", "associating", "providing", "transferring", "sending", "causing", "encoding", "preventing", "waking up", "supplying", "enabling", "transmitting", or the like, refer to the action and/or processes of any combination of software, hardware and/or firmware.

Embodiments of the present invention may use terms such as, processor, bus, architecture, computer, apparatus, system, sub-system, logic, component, function, supply, host, module, unit, device, or variants thereof (in single or plural form) for performing the operations described herein. These terms, as appropriate, refer to any combination of software, hardware and/or firmware configured to perform the operations as defined and explained herein.

Embodiments of the invention do not limit the current/voltage levels for the various states of the USB bus and these may vary depending on the embodiment. For the sake of example, however, it is presented that under the current USB standard, when the USB bus that is coupled to a USB device (e.g. coupled to the upstream port of the USB device) is operating (i.e. active), the USB device may draw up to 500 mA of current from the USB bus; when the USB bus is suspended, the USB device may draw up to 2.5 mA from the bus; and when the USB bus is not powered, the USB device cannot draw current from the bus. In some embodiments, a wakeup generation module associated with the USB device is provided with power irrespective of the state of the USB bus. For example, in one of these embodiments the wakeup generation module is powered by standby power (also known as auxiliary power). Similarly, in some embodiments a host wakeup module may be provided with power irrespective of the state of the USB bus. For example, in one of these embodiments the host wakeup module is powered by standby power.

Embodiments of the invention do not limit the configuration of the USB bus. For example, under the current USB standard, the USB bus includes four wires for Vbus, ground, D+, D−. However, it is possible that under future USB standards, the USB bus may include fewer or more wires and/or wires with different functionality. Continuing with the example, it is possible that the single-wire sideband for wakeup that is discussed herein may in the future be included in the USB bus. Therefore the term "single-wire sideband" or variants thereof for wakeup should be understood to refer herein to a line other than the four wires (Vbus, ground, D+, D−) that are included in the USB bus under the current USB standard, not precluding the possibility that such a line may in the future be part of the USB bus. Similarly, the term "sideband wakeup signal" or variants thereof should be understood to refer herein to a wakeup signal which is transmitted on a single wire that is not one of the four wires (Vbus, ground, D+, D−) included in the USB bus under the current USB standard, not precluding the possibility that such a wire may in the future be part of the USB bus.

Embodiments of the invention do not limit the electronic system which includes the USB device whose associated wakeup generation module participates in waking up a USB bus from the non-powered state. For example, the electronic system may in some cases be a computer, but not necessarily. Embodiments of the invention do not limit the location of the associated USB device in the electronic system. For example the USB device may be on the main (i.e. primary) system board (e.g. motherboard) of the electronic system, may be on an expansion card, or may be a peripheral. Embodiments of the invention do not limit the composition or functionality of the associated USB device. For example, in some embodiments, the associated USB device includes a USB device interface module, one or more device function module(s), and optionally part or all of the wakeup generation module. The wakeup generation module, the USB device interface module, and any device function module(s) may each be made up of any combination of hardware, software and/or firmware capable of performing the operations as defined and explained herein. In one of these embodiments, for example, the USB device interface module includes a USB device controller and a USB PHY where the USB device controller implements the digital module and the USB PHY implements the physical layer as is known in the art. In embodiments with one or more device function module(s), device function module(s) implement any other functionality of the USB device not performed by USB device interface module (or the wakeup generation module), where the functionality may vary depending on the embodiment.

In some embodiments a USB device and a USB host which are in an electronic system may communicate via the D+ and D− data lines of a USB bus when the USB bus is active or suspended. In some of these embodiments, the USB host is comprised in a host which also includes a USB power supply, a host wakeup module, and optionally other module(s). In various embodiments, the USB power supply, host wakeup module and optionally the USB host participate in waking up the USB bus from a non-powered state. Each of the host wakeup module, USB host, and USB power supply may be made up of any combination of hardware, software and/or firmware capable of performing the operations as defined and explained herein. In various embodiments, for example, the host wakeup module may include any of the following: an Advanced Configuration and Power Interface "ACPI" controller, an embedded controller "EC", a system management controller "SMC", dedicated power management "PM" (which controls power on logic), interrupt (and/or event) driven code, and/or a combination of any of the above. The host wakeup module is not limited to these examples and may additionally or alternatively comprise any suitable hardware, software and/or firmware.

Referring now to the drawings, FIG. 1 illustrates a method 100 for waking up a USB bus from a non-powered state, for example to a suspended or active state, according to an embodiment of the present invention. In some embodiments, method 100 may include fewer, more and/or different stages than illustrated in FIG. 1, the stages may be executed in a different order than shown in FIG. 1, stages that are illustrated as being executed sequentially may be executed in parallel, and/or stages that are shown as being executed in parallel may be executed sequentially.

In the illustrated embodiment, in stage 102, the wakeup generation module which is associated with a USB device detects a wakeup condition. Depending on the embodiment, the wakeup generation module may be inside, outside, or partially inside and partially outside of the associated USB device. The wakeup condition can be detected for example in one embodiment where the wakeup generation module is outside the associated USB device, by way of a received wakeup request, from a source external to the associated USB device ("external wakeup request"). In one embodiment where the wakeup generation module is at least partly inside the associated USB device, the wakeup condition can be detected for example by way of a wakeup request originating from a source external to the associated USB device ("external wakeup request") and/or from an internal source such as (one of) the device function module(s) of the USB device ("internal wakeup request").

In some embodiments where the wakeup generation module is at least partially within the USB device, an internal wakeup request may in some cases be directed (for example by the generator of the request such as a device function module) to the wakeup generation module or to the USB device interface module, depending on the state of the USB bus. For example, in one of these embodiments, the internal request may be directed to the wakeup generation module when the bus is not powered and to the USB device interface module when the bus is suspended, so that the USB device interface module can generate resume signaling on the USB bus as is known in the art. In other embodiments where the wakeup generation module is at least partially within the USB device, an internal request may in some cases be directed both to the wakeup generation module and to the USB device interface module, or may be directed only to the wakeup generation module. Similarly, in various embodiments (regardless of whether the wakeup generation module is external or at least partially internal to the USB device) a request from a source external to the USB device may be directed to either the wakeup generation module or the USB interface module, depending on the state of the USB bus, or may be directed to the wakeup generation module or to both the wakeup generation module and the USB interface module. The directing of the external wakeup request may be preformed for example by the external source, or may possibly be performed by the USB device (for example by a device function module) when the wakeup generation module is at least partially internal to the USB device.

Wakeup conditions are not limited by the invention, and may vary depending on the functionality of the associated USB device, relevant external sources, and/or the embodiment. However, for the sake of illumination to the reader, a few examples are now given. For example, if the associated USB device includes a media card reader, then in one embodiment, the insertion of a media card may constitute a wakeup condition. As another example, the periodic wakeup of a counter may in one embodiment constitute a wakeup condition. As another example, an infrared transaction may constitute a wakeup condition in one embodiment.

In the illustrated embodiment, in stage 104, the wakeup generation module determines whether or not the USB bus coupled to the associated USB device (e.g. coupled to the upstream port of the associated USB device) is in the non-powered state. For example, in cases where the wakeup generation module can access the power line of the USB bus, the wakeup generation module can check the voltage on the power line to see whether or not the USB bus is in the non-powered state. As another example, the wakeup module may get an indication from the associated USB device (for example from a device function module) of whether or not the USB bus is in the non-powered state.

In the illustrated embodiment, if the USB bus is not powered (yes to stage 104), then stages 106 to 110 are executed. In this embodiment, if conversely the USB bus is active or suspended (no to stage 104), then method 100 (whose purpose is to wake up the USB bus from a non-powered state) ends. For example, if the bus is in the suspended state, then in some cases resume signaling may be generated instead of execution of stages 106 to 110. Continuing with the example, in some cases where the USB bus is active or suspended (no to stage 104), the wakeup generation module may pass a received wakeup request or otherwise indicate a detected wakeup condition to the USB device interface module which will generate resume signaling, provided the USB bus is suspended (or for example ignore the wakeup request if the USB bus is active). Continuing with the example, in other cases where the USB bus is active or suspended (no to stage 104), the wakeup generation module may not pass the received wakeup request or otherwise indicate a detected wakeup condition to the USB device interface module because it may be assumed that the USB device interface module also received the wakeup request or otherwise detected the wakeup condition.

In some embodiments, stage 104 may instead be omitted. For example, in an embodiment where a sideband wakeup signal is generated by the wakeup generation module, stage 104 may in some cases be omitted with stages 106 to 110 executed directly after stage 102, regardless of the state of the USB bus.

As another example, in one embodiment, stage 104 may be omitted and stages 106 to 110 executed directly after stage 102 because in this embodiment the wakeup generation module only detects wakeup conditions that occur when the USB bus is not powered (for example because the wakeup generation module only receives wakeup requests if the bus is not powered).

In the illustrated embodiment, in stage 106, the wakeup generation module generates a wakeup signal due to the wakeup condition. In one embodiment, where the power line is coupled to the wakeup generation module, the wakeup signal can be generated on a power line of the USB bus. In one embodiment, additionally or alternatively, the wakeup generation module may generate a sideband wakeup signal.

In the illustrated embodiment, in stage 108, the host wakeup module detects the wakeup signal. For example, the host wakeup module may detect a wakeup signal on the power line of the USB bus and/or may detect a sideband wakeup signal.

Embodiments of the invention do not limit the wakeup signal generated by the wakeup generation module. In some embodiments where the wakeup signal is generated on the power line of the USB bus, the wakeup signal may be indicated by a wakeup voltage which is distinguishable from any voltage which would be on the USB power line when the USB bus is in the active state or suspended state. For example, assuming that in the active and suspended states the voltage on the power line is for example above 4 volts, and when the USB bus is not powered the voltage on the power line is for example around 0 volts, the wakeup voltage may be set in one of these embodiments to a voltage between these two values, for example 3.3 volts. In some of these embodiments, the host wakeup module may monitor the power line for a voltage equivalent to a predetermined wakeup voltage value or may monitor for a voltage in a range. A possible range may include, for example the predetermined wakeup voltage value plus or minus a predetermined deviation, or for example may extend between the non-powered voltage level (or the non-powered voltage level plus a predetermined deviation) and the lowest voltage level corresponding to the active or suspended state (or the lowest voltage level minus a predetermined deviation). It is also possible that in some of these embodiments additional information such as the wakeup condition may be encoded in the wakeup signal in any appropriate manner. For example different wakeup conditions may be indicated by using a corresponding (different) voltage value for each wakeup condition, a corresponding (different) voltage range for each wakeup condition, or a corresponding (different) toggling sequence (i.e. sequence of logic '0's and/or logic '1') for each wakeup condition. Continuing with the example and assuming different possible voltage values, ranges or toggling sequences, each indicating different wakeup conditions, the host wakeup module may monitor the power line for the different voltage values, voltage ranges, or toggling sequences and decode the wakeup condition based on the detected voltage value, range, or toggling sequence.

In some embodiments where the wakeup signal is generated on the power line of the USB bus, the wakeup voltage may not necessarily be distinguishable from voltages normally on the power line when the USB bus is active or suspended. For example, in various of these latter embodiments, any detected voltage on the power line when the bus is not powered, or any detected voltage on the power line above a predetermined threshold when the bus is not powered, is treated as a digital logic wakeup signal by the host wakeup module and the voltage value need not be measured by the host wakeup module.

In embodiments where the wakeup signal is a sideband wakeup signal, the single-wire sideband used by the wakeup generation module to transmit the wakeup signal to the host wakeup module may be any suitable line other than the four wires (Vbus, ground, D+, D−) which are included in the USB bus under the current USB standard. In one of these embodiments, the sideband wakeup signal does not carry any additional information. In this embodiment any signal on the single-wire sideband is similarly treated as a wakeup signal, for example any voltage or any voltage above a predetermined threshold may in some cases be detected as a wakeup signal. In another of these embodiments, additional information such as the wakeup condition may be encoded in the wakeup signal in any appropriate manner. For example, the additional information such as the wakeup condition may be indicated using a corresponding (different) toggling sequence (i.e. sequence of logic '1's and/or '0's) for each wakeup condition, a corresponding (different) voltage range for each wakeup condition, or a corresponding (different) voltage value for each wakeup condition, In this example, the host wakeup module may decode the additional information which was encoded by way of toggling sequence, voltage range, or voltage value in the wakeup signal.

In the illustrated embodiment in stage 110, once the host wakeup module has detected a wakeup signal, the host power up sequence is performed. The host power up sequence is not limited by the invention and may vary depending on the implementation.

For example, in some embodiments, the host power up sequence includes the host wakeup module enabling a USB power supply to supply power to the USB bus. In one of these embodiments, when the USB power supply begins supplying power to the USB bus, USB device(s) coupled to the bus initially transitions from the attached device state to the powered state and then optionally to any other device state, but in another of these embodiments this transition sequence is not necessarily followed. Optionally in some of these embodiments, the host wakeup module may also provide a host wakeup signal to the USB host so that the USB host can ensure that the logic levels on the USB bus data lines (D+, D−) are known. In some cases, the host wakeup signal, if provided, is provided after the enablement of the power supply so that the voltage level on the power line of the USB bus may first be stabilized before the logic levels on the data lines are ensured to be known. In some cases, a USB enumeration then follows. The host power up sequence is known in the art and will therefore not be further elaborated on except when required to understand embodiments of the invention.

In one embodiment where the wakeup signal is generated by the wakeup generation module regardless of the state of the USB bus, the host wakeup module may ignore the detected wakeup signal if the USB bus is active or suspended, and not execute stage 110. For example, the host wakeup module may in some cases be able to sense that the USB power supply is already supplying power and thereby deduce that the USB bus is active or suspended. In another embodiment where the wakeup signal is generated by the wakeup generation module regardless of the state of the USB bus, the host wakeup module may initiate the host power up sequence to no effect when the USB bus is active or suspended (for example enabling a power supply which is already enabled, sending a host wakeup signal to a USB host which is already awake, etc). For example, in some cases the USB host may possibly receive both a resume signal from the USB device interface module and a host wakeup signal from the host wakeup module due to the same wakeup condition.

Once method 100 has been completed, the USB bus has been woken up from the non-powered state and may be active or suspended, depending on the embodiment.

Now will be presented some of the possible configurations for executing embodiments of method 100. Examples of configurations for executing embodiments of method 100 are illustrated by wakeup systems 200, 300, 400, 500, 600, 700 and 800 in FIGS. 2, 3, 4, 5, 6, 7, and 8 respectively. Depending on the embodiment, any of wakeup systems 200, 300, 400, 500, 600, 700 or 800 may or may not be part of a larger electronic system. Embodiments where a wakeup system (200, 300, 400, 500, 600, 700 or 800) is part of a larger electronic system do not limit the arrangement of the wakeup system (200, 300, 400, 500, 600, 700 or 800) within the larger electronic system. For example in one of these embodiments, within the larger electronic system, the main system board may comprise the complete wakeup system (200, 300, 400, 500, 600, 700 or 800). As another example in one of these embodiments, within the larger electronic system, a wakeup system (200, 300, 400, 500, 600, 700 or 800) may be distributed between the main system board and peripheral(s) (and/or expansion card(s)). Wakeup system 200, 300, 400, 500, 600, 700 and 800 are not necessarily limited to the modules illustrated in FIGS. 2, 3, 4, 5, 6, 7, and 8 respectively. In some cases wakeup system 200, 300, 400, 500, 600, 700 and 800 may comprise fewer, more and/or different modules than illustrated in FIGS. 2, 3, 4, 5, 6, 7, and 8 respectively. Each module in wakeup system 200, 300, 400, 500, 600, 700 and 800 may be made up of any combination of hardware, software and/or firmware capable of performing the operations as defined and explained herein.

For simplicity of illustration, the wakeup generation module is shown in FIGS. 2, 3, 4, 5, 6, 7, and 8 as being inside the associated USB device, but as mentioned above, in some embodiments the wakeup generation module may instead be fully or partially outside the USB device.

Figure 2:
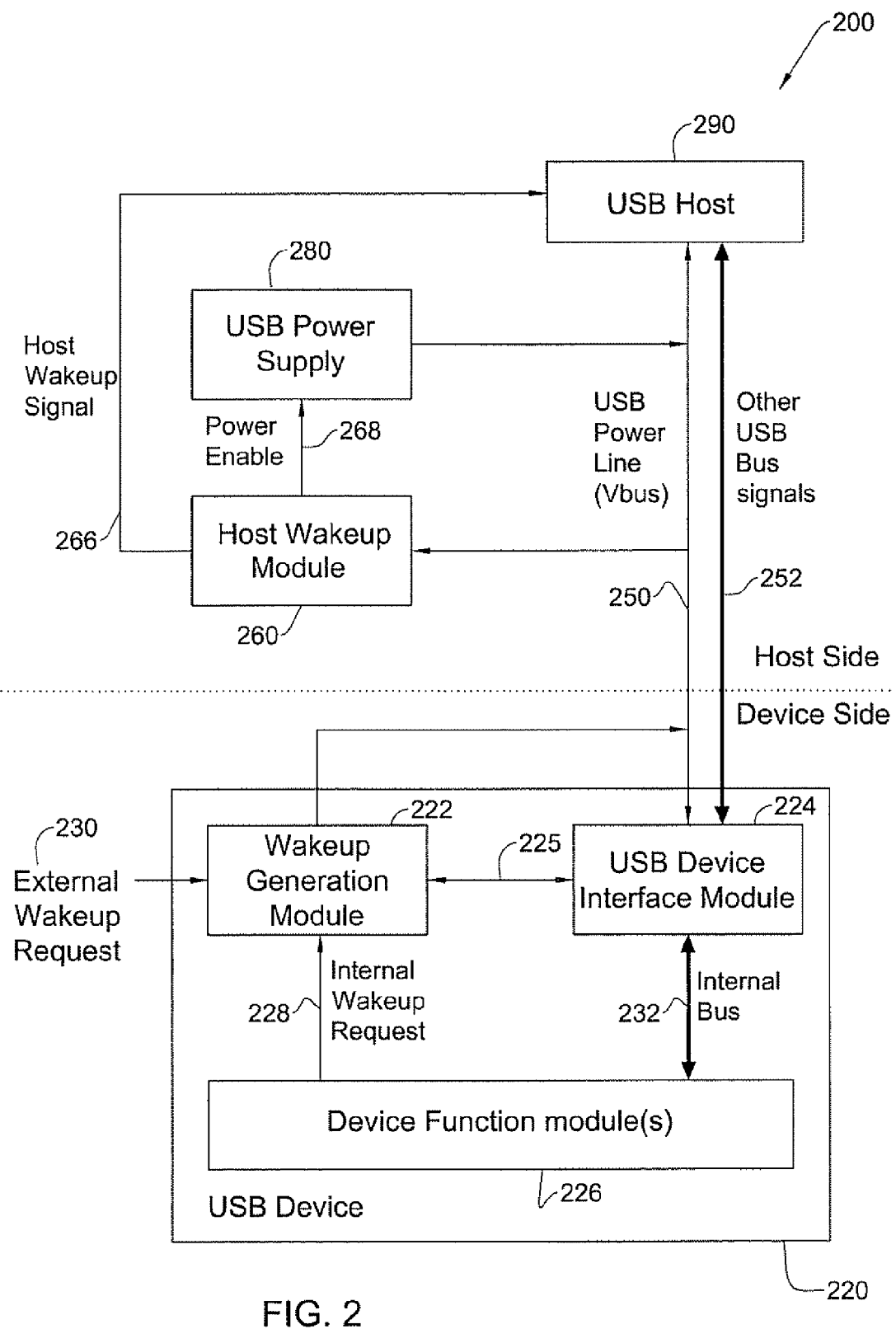
FIG. 2 is a block diagram of a system for wakeup via a power line when the USB bus is not powered, according to an embodiment of the present invention.

FIG. 2 is a block diagram of system 200 for wakeup via a power line when the USB bus is not powered, according to an embodiment of the present invention.

In the illustrated embodiment, a USB device 220 comprises a USB device interface module 224, one or more device function module(s) 226, and a wakeup generation module 222. An internal bus 232 couples between device function module(s) 226 and USB device interface module 224. Optionally, there may be an interface 225 between wakeup generation module 222 and USB device interface module 224 (for example so that wakeup generation module 222 can pass wakeup requests or otherwise indicate detected wakeup conditions to USB device interface module 224 when required). A USB bus is coupled between a USB host 290 and the USB device interface module 224. The USB bus includes the power line 250 of the USB bus and the other USB bus lines 252 (the other USB bus lines 252 including at least D+, D− and ground). When the USB bus is active or suspended, power is supplied by a USB power supply 280 to power line 250. Power line 250 is routed between wakeup generation module 222 and host wakeup module 260 so that a wakeup signal can be transmitted on power line 250 from wakeup generation module 222 to host wakeup module 260 when it is desired to wake up the USB bus from the non-powered state.

In one embodiment, any pin (of any module of system 200) which is coupled to power line 250 must be capable of tolerating the current and voltage on power line 250 during wakeup (due to the wakeup signal generated by wakeup generation module 222) and the current and voltage on power line 250 when the USB bus is active or suspended. In one embodiment, additionally or alternatively, wakeup generation module 222 is required to supply sufficient driving current to reach a desired wakeup voltage level, range, or toggling sequence for the wakeup signal. In this embodiment, the required quantity of driving current may in some cases be more likely to be achieved if USB power supply 280 and USB host 290 present a sufficiently high impedance at power ports thereof when the USB bus is not powered and therefore current leakage from wakeup generation module 222 to USB power supply 280 and USB host 290 is minimized. In another embodiment, if there is an inhibiting module (see for example diode 554 in FIG. 5 below) which isolates USB power supply 280 and USB host 290 from the wakeup signal generated by wakeup generation module 222, USB power supply 280 and USB host 290 may not necessarily be required to be capable of tolerating the current and voltage present due to the wakeup signal generated by wakeup generation module 222. Similarly, because current leakage to USB power supply 280 and USB host 290 would be blocked by the inhibiting module, it would not be relevant whether or not USB power supply 280 and USB host 290 present a sufficiently high impedance at power ports thereof when the USB bus is not powered for achieving sufficient driving current. In another embodiment, alternatively or additionally, a preventing module or part thereof (see for example, diode 538 and/or switch 536 of FIG. 5) may be implemented in order to prevent the voltage on power line 250 when the USE bus is active or suspended from reaching wakeup generation module 222 and/or to prevent the wakeup signal generated by wakeup generation module 222 on power line 250 from reaching USB device interface module 224. In this embodiment where preventing module or a part thereof is implemented, then in various cases, USB interface module 224 need not necessarily tolerate the current and voltage on power line 250 when wakeup generation module 222 is generating a wakeup signal, wakeup generation module 222 need not necessarily tolerate the current and voltage on power line 250 when the USB bus is active or suspended, and/or wakeup generation module 222 may be more likely to reach a desired wakeup voltage level, range or toggling sequence for the wakeup signal because current leakage from wakeup generation module 222 to USB interface module 224 via power line 250 is prevented.

Some of the embodiments of method 100 will now be briefly reviewed with reference to the illustrated embodiment in FIG. 2. In stage 102 wakeup generation module 222 detects an internal wakeup request 228 from device function module 226 or an external wakeup request 230. Stage 104 may then optionally be executed by wakeup generation module 222. Assuming that in stage 106, the wakeup signal is generated by wakeup generation module 222 on power line 250, host wakeup module 260 detects the wakeup signal in stage 108. In stage 110, host wakeup module 260 transmits a power enable signal 268 to USB power supply 280. When enabled, USB power supply 280 supplies power to power line 250, for example as appropriate for an active or suspended bus. Host wakeup module 260 optionally may also communicate a host wakeup signal 266 to USB host 290, for example once the voltage level has stabilized on power line 250, so that USB host 290 may ensure that the logic levels of the data lines on the USB bus are known. Refer above to the discussion of FIG. 1 for more details on embodiments of method 100.

Figure 3:
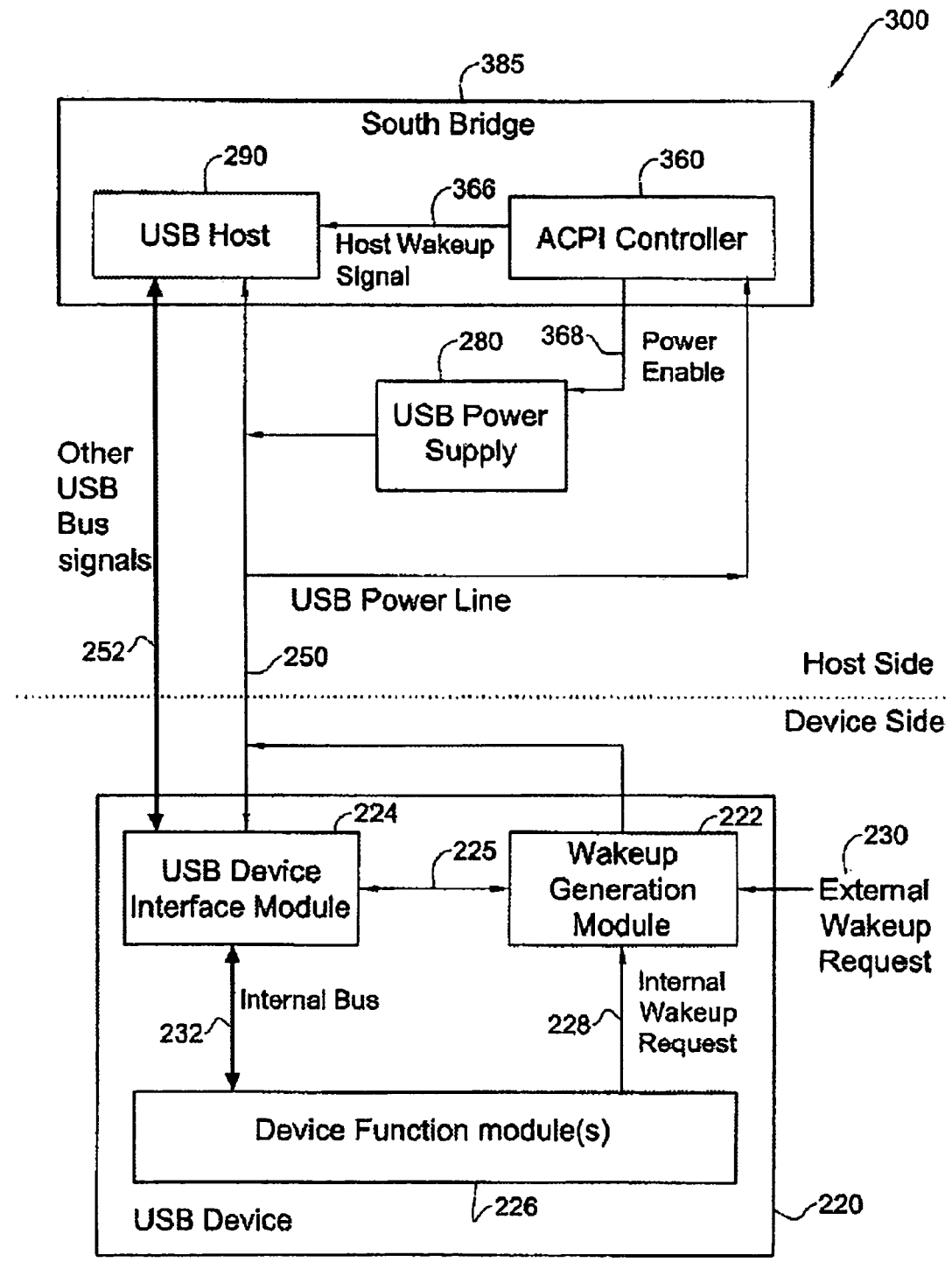
FIG. 3 is a block diagram of a system which illustrates one example of the system of FIG. 2, where the host wakeup module includes an ACPI controller, according to an embodiment of the present invention.

FIG. 3 is a block diagram of a system 300 which illustrates one example of system 200 of FIG. 2, where the host wakeup module includes an ACPI controller, according to an embodiment of the present invention. The ACPI specification is an open industry standard that defines common interfaces for hardware recognition, motherboard and device configuration, and power management. In the embodiment illustrated in FIG. 3, the power line is routed to an ACPI controller so that the ACPI controller can detect a wakeup signal on the power line. Elements in FIG. 3 which are also shown in FIG. 2 are labeled with the same number.

In the illustrated embodiment, USB device 220 comprises USB device interface module 224, one or more device function module(s) 226, and wakeup generation module 222. Internal bus 232 couples between device function module(s) 226 and USB device interface module 224. Optionally, there is an interface 225 between wakeup generation module 222 and USB device interface module 224. The USB bus is coupled between USB host 290 (which is located in the South Bridge 385 of the main system board of the electronic system)

and USB device interface module 224. The USB bus includes power line 250 of the USB bus and other USB bus lines 252 (the other USB bus lines 252 including at least D+, D−, and ground). When the USB bus is active or suspended, power is supplied by USB power supply 280 to power line 250. Power line 250 is routed between wakeup generation module 222 and an ACPI controller 360 (an example of host wakeup module 260) so that a wakeup signal can be transmitted on power line 250 from wakeup generation module 222 to ACPI controller 360 when it is desired to wake up the USB bus from the non-powered state.

In the illustrated embodiment, ACPI controller 360 is located in South Bridge 385, for example because of the presence of USB host 290 in South Bridge 385 and the typical presence of power management functions in the South Bridge of the main system board. However in other embodiments, ACPI controller 360 may be located elsewhere.

In one embodiment, any pin (of any module of system 300) which is coupled to power line 250 must be capable of tolerating the current and voltage on power line 250 during wakeup (due to the wakeup signal generated by wakeup generation module 222) and the current and voltage on power line 250 when the USB bus is active or suspended. In one embodiment, additionally or alternatively, wakeup generation module 222 is required to supply sufficient driving current to reach a desired wakeup voltage level, range, or toggling sequence for the wakeup signal. In this embodiment, the required quantity of driving current may in some cases be more likely to be achieved if USB power supply 280 and USB host 290 present a sufficiently high impedance at power ports thereof when the USB bus is not powered and therefore current leakage from wakeup generation module 222 to USB power supply 280 and USB host 290 is minimized. In another embodiment, if there is an inhibiting module (see for example diode 554 in FIG. 5 below) which isolates USB power supply 280 and USB host 290 from the wakeup signal generated by wakeup generation module 222, USB power supply 280 and USB host 290 may not necessarily be required to be capable of tolerating the current and voltage present due to the wakeup signal generated by wakeup generation module 222. Similarly, because current leakage to USB power supply 280 and USB host 290 would be blocked by the inhibiting module, it would not be relevant whether or not USB power supply 280 and USB host 290 present a sufficiently high impedance at power ports thereof when the USB bus is not powered for achieving sufficient driving current. In another embodiment, alternatively or additionally, a preventing module or part thereof (see for example, diode 538 and/or switch 536 of FIG. 5) may be implemented in order to prevent the voltage on power line 250 when the USB bus is active or suspended from reaching wakeup generation module 222 and/or to prevent the wakeup signal generated by wakeup generation module 222 on power line 250 from reaching USB device interface module 224. In this embodiment where preventing module or a part thereof is implemented, then in various cases, USB interface module 224 need not necessarily tolerate the current and voltage on power line 250 when wakeup generation module 222 is generating a wakeup signal, wakeup generation module 222 need not necessarily tolerate the current and voltage on power line 250 when the USB bus is active or suspended, and/or wakeup generation module 222 may be more likely to reach a desired wakeup voltage level, range or toggling sequence for the wakeup signal because current leakage from wakeup generation module 222 to USB interface module 224 via power line 250 is prevented.

Some of the embodiments of method 100 will now be briefly reviewed with reference to the illustrated embodiment in FIG. 3. In stage 102 wakeup generation module 222 detects an internal wakeup request 228 from device function module 226 or an external wakeup request 230. Stage 104 may then optionally be executed by wakeup generation module 222. Assuming that in stage 106, the wakeup signal is generated by wakeup generation module 222 on power line 250, ACPI controller 360 detects the wakeup signal in stage 108. In stage 110, ACPI controller 360 transmits a power enable signal 368 to USB power supply 280. For example, in one embodiment, an ACPI compliant general purpose input wake events in ACPI controller 360 may detect the wakeup signal, and generate an interrupt to a Basic Input/Output System or operating system of ACPI controller 360 which services the interrupt and enables power via a general purpose output of ACPI controller 360. When enabled, USB power supply 280 supplies power to power line 250, for example as appropriate for an active or suspended bus. ACPI controller 360 optionally may also communicate a host wakeup signal 366 to USB host 290, for example once the voltage level has stabilized on power line 250 and for example via a logical wakeup channel, so that USB host 290 may ensure that the logic levels of the data lines on the USB bus are known. In one embodiment, ACPI controller 360 uses interfaces defined in the ACPI specification to provide the power enable signal 368 and optionally host wakeup signal 366 to USB power supply 280 and USB host 290 respectively. Refer above to the discussion of FIG. 1 for more details on embodiments of method 100.

Figure 4:
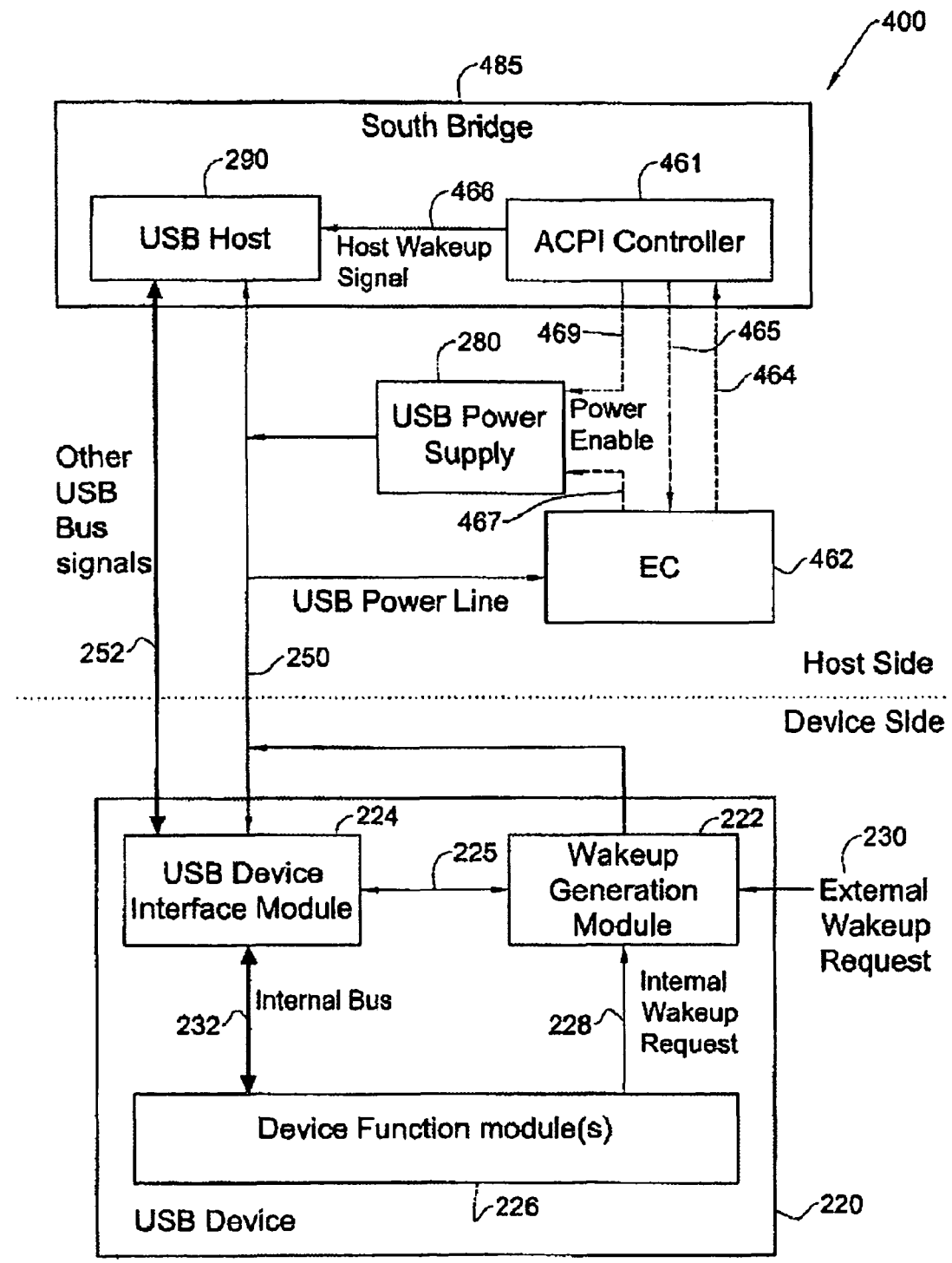
FIG. 4 is a block diagram of a system which illustrates one example of the system of FIG. 2, where the host wakeup module includes an embedded controller and an ACPI controller, according to an embodiment of the present invention.

FIG. 4 is a block diagram of a system 400 which illustrates one example of system 200 of FIG. 2, where the host wakeup module includes an embedded controller and an ACPI controller, according to an embodiment of the present invention. Elements in FIG. 4 which are also shown in FIG. 2 are labeled with the same number.

In the illustrated embodiment, USB device 220 comprises USB device interface module 224, one or more device function module(s) 226, and wakeup generation module 222. Internal bus 232 couples between device function module(s) 226 and USB device interface module 224. Optionally, there is an interface 225 between wakeup generation module 222 and USB device interface module 224. The USB bus is coupled between USB host 290 which is located in the South Bridge 485 of the main system board of the electronic system and USB device interface module 224. The USB bus includes power line 250 of the USB bus and other USB bus lines 252 (the other USB bus lines 252 including at least D+, D−, and ground). When the USB bus is active or suspended, power is supplied by USB power supply 280 to power line 250.

In the illustrated embodiment, the host wakeup module comprises an embedded controller 462 and an ACPI controller 461 and there is a communication channel between controllers 461 and 462. Embedded controller 462 and ACPI controller 461 may divide the functionality of the host wakeup module in any appropriate manner. For example, in the illustrated embodiment, power line 250 is shown routed between wakeup generation module 222 and embedded controller 462 so that a wakeup signal can be transmitted on power line 250 from wakeup generation module 222 to embedded controller 462 when it is desired to wake up the USB bus from the non-powered state. However, in other embodiments, power line 250 may be routed additionally or alternatively to ACPI controller 461. As another example, embedded controller 462 and ACPI controller 461 may divide tasks in the host power up sequence differently, depending on the embodiment. ACPI controller 461 is shown located in South Bridge 485, for example because of the presence of USB host 290 in South Bridge 485 and the typical presence of power management functions in the South Bridge of the main system board. However, in other embodiments, ACPI controller 461 may be located elsewhere.

In one embodiment, any pin (of any module of system 400) which is coupled to power line 250 must be capable of tolerating the current and voltage on power line 250 during wakeup (due to the wakeup signal generated by wakeup generation module 222) and the current and voltage on power line 250 when the USB bus is active or suspended. In one embodiment, additionally or alternatively, wakeup generation module 222 is required to supply sufficient driving current to reach a desired wakeup voltage level, range, or toggling sequence for the wakeup signal. In this embodiment, the required quantity of driving current may in some cases be more likely to be achieved if USB power supply 280 and USB host 290 present a sufficiently high impedance at power ports thereof when the USB bus is not powered and therefore current leakage from wakeup generation module 222 to USB power supply 280 and USB host 290 is minimized. In another embodiment, if there is an inhibiting module (see for example diode 554 in FIG. 5 below) which isolates USB power supply 280 and USB host 290 from the wakeup signal generated by wakeup generation module 222, USB power supply 280 and USB host 290 may not necessarily be required to be capable of tolerating the current and voltage present due to the wakeup signal generated by wakeup generation module 222. Similarly, because current leakage to USB power supply 280 and USB host 290 would be blocked by the inhibiting module, it would not be relevant whether or not USB power supply 280 and USB host 290 present a sufficiently high impedance at power ports thereof when the USB bus is not powered for achieving sufficient driving current. In another embodiment, alternatively or additionally, a preventing module or part thereof (see for example, diode 538 and/or switch 536 of FIG. 5) may be implemented in order to prevent the voltage on power line 250 when the USB bus is active or suspended from reaching wakeup generation module 222 and/or to prevent the wakeup signal generated by wakeup generation module 222 on power line 250 from reaching USB device interface module 224. In this embodiment where preventing module or a part thereof is implemented, then in various cases, USB interface module 224 need not necessarily tolerate the current and voltage on power line 250 when wakeup generation module 222 is generating a wakeup signal, wakeup generation module 222 need not necessarily tolerate the current and voltage on power line 250 when the USB bus is active or suspended, and/or wakeup generation module 222 may be more likely to reach a desired wakeup voltage level, range or toggling sequence for the wakeup signal because current leakage from wakeup generation module 222 to USB interface module 224 via power line 250 is prevented.

Some of the embodiments of method 100 will now be briefly reviewed with reference to the illustrated embodiment in FIG. 4. In stage 102 wakeup generation module 222 detects an internal wakeup request 228 from device function module 226 or an external wakeup request 230. Stage 104 may optionally be executed by wakeup generation module 222. Assuming that in stage 106, the wakeup signal is generated by wakeup generation module 222 on power line 250, the wakeup signal is detected in stage 108. In the illustrated embodiment, power line 250 is routed to embedded controller 462, and therefore embedded controller 462 detects the wakeup signal in stage 108. However, in another embodiment power line 250 may additionally or alternatively be routed to ACPI controller 461, and ACPI controller 461 may detect the wakeup signal. In stage 110, the host power up sequence is executed.

The participation by ACPI controller 461 and embedded controller 462 in the host power up sequence of stage 110 may vary depending on the embodiment and is not limited by the invention. However for the sake of further illustration, some embodiments are shown in FIG. 4. In these embodiments, it is assumed that embedded controller 462 detected the wakeup signal. In one of these embodiments, upon detection of the wakeup signal, embedded controller 462 communicates a signal 464 to ACPI controller 461 and ACPI controller 461 in turn transmits a power enable signal 469 to USB power supply 280. In another of these embodiments, upon detection of the wakeup signal, embedded controller 462 communicates signal 464 to ACPI controller 461 and also transmits a power enable signal 467 to USB power supply 280. In another of these embodiments, upon detection of the wakeup signal, embedded controller 462 communicates signal 464 to ACPI controller 461, waits for a response 465 from ACPI controller 461 and then transmits power enable signal 467 to USB power supply 280. In these embodiments, once USB power supply 280 has been enabled, USB power supply 280 supplies power to power line 250, for example as appropriate for an active or suspended bus. ACPI controller 461 optionally may also communicate a host wakeup signal 466 to USB host 290, for example once the voltage level has stabilized on power line 250, so that USB host 290 may ensure that the logic levels of the data lines on the USB bus are known. In one embodiment, ACPI controller 461 uses interfaces defined in the ACPI specification when communicating with other modules in system 400. Refer above to the discussion of FIG. 1 for more details on embodiments of method 100.

Figure 5:
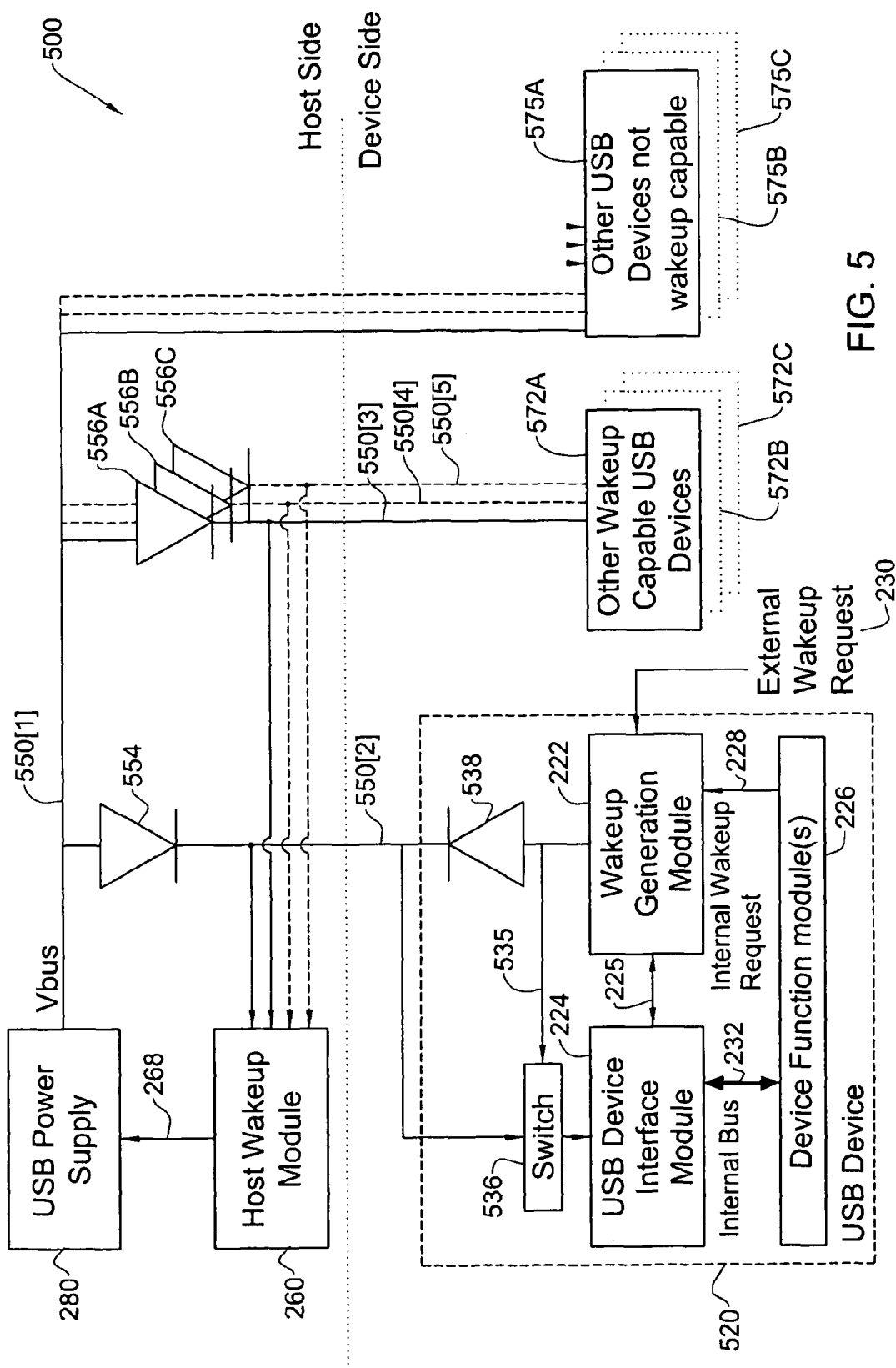
FIG. 5 is a block diagram of a system which illustrates one example of the system of FIG. 2, including isolating module(s), according to an embodiment of the present invention.

FIG. 5 is a block diagram of a system 500 which illustrates one example of system 200 of FIG. 2, including isolating module(s), according to an embodiment of the present invention. In order to improve readability, two types of isolating modules which are described herein by way of example are arbitrarily termed "preventing module" and "Inhibiting module". For simplicity's sake, the discussion of the isolating function of the isolating modules assumes perfect isolation, although in practice perfect isolation may not be achieved. Elements in FIG. 5 which are also shown in FIG. 2 are labeled with the same number. In order to simplify the explanation of FIG. 5, different segments of power line 250 (of FIG. 2) are labeled in FIG. 5 as power line 550[1], . . . 550[n], thereby distinguishing between segments of the power line which are separated by inhibiting module(s). As shown in FIG. 5, there are five power lines 550[1 . . . 5] but this number should not be construed as limiting, and in other embodiments there may be less or more.

In the illustrated embodiment, a USB device 520 comprises USB device interface module 224, one or more device function module(s) 226, wakeup generation module 222, and a preventing module. Internal bus 232 couples between device function module(s) 226 and USB device interface module 224. Optionally, there is an interface 225 between wakeup generation module 222 and USB device interface module 224.

In the illustrated embodiment, the preventing module includes a diode 538 so that power which is on power line 550[2] when the USB bus is active or suspended does not reach wakeup generation module 222. Therefore, in this embodiment, wakeup generation module 222 is capable of tolerating the current and voltage on power line 550[2] when generating the wakeup signal but not necessarily required to be capable of tolerating the current and voltage on power line 550[2] when the USB bus is active or suspended. In the illustrated embodiment, the preventing module additionally or alternatively includes a switch 536 which is controlled via control line 535 and which prevents a wakeup signal generated by wakeup generation module 222 on power line 550[2] from reaching USB device interface module 224. For example, when wakeup generation module 222 generates a wakeup signal on power line 550[2], there is a high voltage on control line 535, and switch 536 prevents current on power line 550[2] from propagating to USB device interface module 224. When wakeup generation module 222 is not generating a wakeup signal on power line 550[2], and provided that any power supplied by USB power supply 280 during an active or suspended USB bus is prevented from reaching wakeup generation module 222 (for example by diode 538), there will be a low voltage on control line 535 and switch 536 will allow current on power line 550[2] to propagate to USB interface module 224. Therefore, in this embodiment, USB interface module 224 is capable of tolerating the current and voltage on power line 550[2] when the USB bus is active or suspended but not necessarily required to be capable of tolerating the current and voltage on power line 550[2] when wakeup generation module 222 is generating a wakeup signal. Additionally or alternatively, in this embodiment, wakeup generation module 222 may be more likely to be able to supply the required driving current to reach a desired wakeup voltage level, range, or toggling sequence for the wakeup signal, because current leakage from wakeup generation module 222 to USB interface module 224 via power line 550[2] is prevented by switch 536. Although the preventing module (e.g. switch 536 and/or diode 538) is illustrated in FIG. 5 inside of USB device 520, in some embodiments the preventing module may be partially or fully outside USB device 520, for example in some cases when wakeup generation module 222 is not fully inside USB device 520. (As mentioned above, for any of the configurations presented in FIGS. 2 to 8, wakeup generation module 222 may be inside, outside, or partially inside and partially outside of the USB device).

In the illustrated embodiment, besides USB device 520, there are other USB device(s). Depending on the embodiment, the other USB device(s) may include USB device(s) associated with wakeup generation module(s) ("other wakeup capable USB device(s)" 572) and/or USB device(s) not associated with wakeup generation module(s) ("other USB device(s) not wakeup capable" 575). For example, in FIG. 5 three other wakeup capable USB devices 572A, 572B, and 572C and three other USB devices that are not wakeup capable 575A, 575B and 575C are illustrated, but it should be evident that in some embodiments there may be more or less of USB devices 572 and/or more or less of USB devices 575. In one embodiment, as will be assumed here for simplicity of description, the other wakeup capable USB device(s) 572 are identical to USB device 520. In this embodiment, and assuming three other wakeup capable USB devices 572, each of power lines 550[2 . . . 5] is routed between a common host wakeup module 260 and wakeup generation module 222 or a wakeup generation module associated with one of the wakeup capable USB device 572 respectively. Therefore, in this embodiment a wakeup signal can be transmitted on any of power lines 550[2 . . . 5] from the corresponding wakeup generation module to host wakeup module 260, when it is desired to wake up the USB bus from the non-powered state. It is noted that in this embodiment, host wakeup module 260 is thus capable of tolerating the current and voltage on power line 550[2 . . . 5] during wakeup (due to the wakeup signal generated by wakeup generation module 222 or a wakeup generation module associated with one of the wakeup capable USB device 572) and the current and voltage on power line 550[2 . . . 5] when the USB bus is active or suspended.

In the described embodiment, when the USB bus is active or suspended, USB power supply 280 supplies power to power line 550[1 . . . 5] of the USB bus. In this embodiment the USB bus (including at least power line 550[1 . . . 5], D+, D− and ground) is coupled between the common USB host and the USB device interface module of each other USB device 572 or 575 in addition to being coupled to USB device interface module 224 of device 520. However for simplicity of illustration, the common USB host is not shown in FIG. 5 and consequently not the USB bus which is coupled between the common USB host and each USB device interface.

In the illustrated embodiment, an inhibiting module on power line 550[2] prevents the wakeup signal generated by wakeup generation module 222 associated with USB device 520 from reaching any other USB device(s) 572 and/or 575, USB power supply 280, and the USB host. For example, the inhibiting module may include a diode 554 on power line 550[2], thereby isolating power line 550[2] on which a wakeup signal is transferred from wakeup generation module 222 associated with USB device 520 to host wakeup module 260. It should be noted that the inhibiting module (e.g. diode 554) may in some cases also prevent the wakeup signal generated by module 222 from reaching the wakeup generation module(s) associated with other USB device(s) 572, even when the associated wakeup generation module(s) are not inside the other USB device(s) 572. It should therefore be understood that when it is stated that the inhibiting module prevents a wakeup signal from reaching a particular wakeup capable USB device 520 or 572, the statement also encompasses embodiments where the wakeup signal is prevented from reaching the associated wakeup generation module.

In embodiments where there are other wakeup capable USB device(s) 572, there may in some cases be an inhibiting module corresponding to one or more of the other wakeup capable USB device(s) 572. For example, in FIG. 5, diodes 556A, 556B, and 556C isolate respective power lines 550[3 . . . 5] on which a wakeup signal from a wakeup generation module associated with respective wakeup-capable USB device 572A, 572B, and 572C is transferred to host wakeup module 260. As another example, instead of an inhibiting module comprising diode 554 or 556, an inhibiting module can comprise a switch with a proper control mechanism.

Assume an embodiment with an inhibiting module on a particular power line (for example any of 550[2 . . . 5] of FIG. 5) corresponding to a particular wakeup capable USB device 520/572. Due to the inhibiting module, in this embodiment all other USB device(s) 572/520/575, USB power supply 280, and the USB host are not necessarily required to be capable of tolerating the current and voltage present on that particular power line when the wakeup generation module associated with the particular wakeup capable USB device 520/572 is generating a wakeup signal. Additionally or alternatively, in this embodiment, the wakeup generation module associated with the particular wakeup capable USB device 520/572 may be more likely to be able to supply the required driving current to reach a desired wakeup voltage level, range, or toggling sequence for the wakeup signal, because current leakage from the associated wakeup generation module to any other USB device 572/520/575, USB power supply 280, and the USB host is prevented by the inhibiting module on the particular power line.

In some embodiments where the USB bus supplied by USB power supply 280 is coupled to a plurality of USB devices, there may in some cases be omitted an inhibiting module and/or part or all of the preventing module (e.g. diode 538 and/or switch 536) for a wakeup capable USB device 520 or 572. In embodiments where the inhibiting module is omitted on a particular power line corresponding to a particular wakeup capable USB device 520 or 572, the wakeup signal from the associated wakeup generation module may in some cases not be prevented from reaching other USB device(s) 572/520/575, USB power supply 280, and the USB host. In these embodiments, the other USB device(s) 572/520/575, USB power supply 280, and the USB host may need to be capable of tolerating inter-alia the current and voltage present on that particular power line when the wakeup generation module associated with the particular wakeup capable USB device 520 or 572 is generating a wakeup signal. In these embodiments, additionally or alternatively, the wakeup generation module associated with the particular wakeup capable USE device 520 or 572 may need to have sufficient driving current strength to accommodate current leakage to the other USB device(s) 520/572/575, USB power supply 280, and the USB host as well as to achieve a desired wakeup voltage level, range, or toggling sequence for the wakeup signal. In these embodiments, USB power supply 280 and the USB host may in some cases present a sufficiently high impedance at power ports thereof when the USB bus is not powered and thereby minimize current leakage from the associated wakeup generation module to USB power supply 280 and the USB host. Alternatively, there may be embodiments with a plurality of USB devices at least one of which is wakeup capable, but inhibiting module(s) are omitted because each wakeup capable USB device is supplied by a different USB power supply. In these embodiments, the not-wakeup capable USB devices may or may not share a common USB power supply. In these embodiments, the required quantity of driving current for a particular wakeup generation module to reach a desired wakeup voltage level, range, or toggling sequence for the wakeup signal may be more likely to be achieved if the corresponding USB power supply and USB host present a sufficiently high impedance at power ports thereof when the USB bus is not powered and therefore current leakage is minimized from the particular wakeup generation module to the corresponding USB power supply and USB host.

In embodiments where part or all of the preventing module is omitted, (for example for USB device 520 or 572A), then depending on the embodiment the associated wakeup generation module and/or the USB device interface module of that USB device may in some cases need to be capable of tolerating both the current and voltage on the corresponding power line (for example 550[2] or 550[3]) due to the wakeup signal generated by the associated wakeup generation module, and the current and voltage on the corresponding power line when the USB bus is active or suspended. Additionally or alternatively, the associated wakeup generation module may need to have sufficient driving current strength to accommodate current leakage to the USB device interface of that device as well as to achieve a desired wakeup voltage level, range, or toggling sequence for the wakeup signal.

Some of the embodiments of method 100 will now be briefly reviewed with reference to the illustrated embodiment in FIG. 5. It is assumed in this brief review that switch 536, diode 538, and diode 554 are present and that if there are other wakeup capable USB device(s) 572, then diode(s) 556 is also present. It is also assumed for simplicity of explanation that the wakeup signal generated in method 100 is generated by wakeup generation module 222 associated with device 520. In stage 102 wakeup generation module 222 detects an internal wakeup request 228 from device function module 226 or an external wakeup request 230. Stage 104 may optionally be executed by wakeup generation module 222. Assuming that in stage 106, the wakeup signal is generated by wakeup generation module 222 on power line 550[2], host wakeup module 260 detects the wakeup signal in stage 108. The generated wakeup signal is prevented from reaching USB interface module 224 by switch 536. For example, when wakeup generation module 222 generates a wakeup signal on power line 550[2], there is a high voltage on control line 535 and switch 536 prevents current on power line 550[2] from propagating to USB device interface module 224. The wakeup signal is also prevented by diode 554 from reaching any other USB device(s) 572 and/or 575, USB power supply 280 and the USB host. In stage 110, host wakeup module 260 transmits a power enable signal 268 to USB power supply 280. USB power supply 280 supplies power to power line 550[1 ... 5], for example, as appropriate for an active or suspended bus. Diode 538 prevents the supplied power from reaching wakeup generation module 222, thus when wakeup generation module 222 stops driving the wakeup signal, control signal 535 changes its state and the power is allowed to propagate to USB device interface module 224 via switch 536 (Optionally similar diodes in other wakeup capable USB device(s) 572 may prevent the supplied power from reaching the associated wakeup generation module(s)). Host wakeup module 260 optionally may also communicate a host wakeup signal to the USB host, for example once the voltage level has stabilized on power line 550[1 ... 5], so that the USB host may ensure that the logic levels of the data lines of the USB bus are known. Refer above to the discussion of FIG. 1 for more details on embodiments of method 100.

Figure 6:
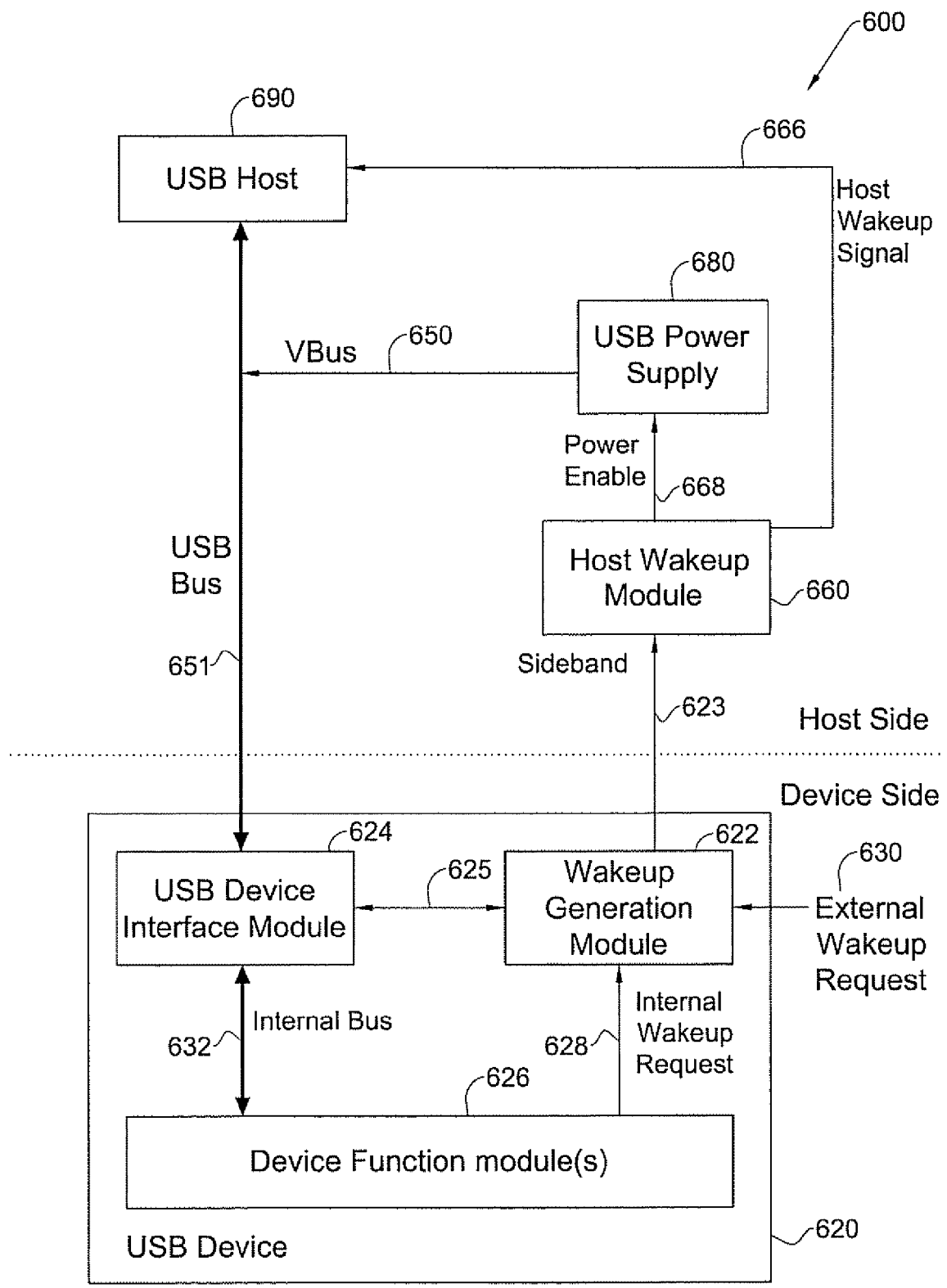
FIG. 6 is a block diagram of a system for wakeup via a single-wire sideband when the USB bus is not powered, according to an embodiment of the present invention.

FIG. 6 is a block diagram of a system 600 for wakeup via a single-wire sideband when the USB bus is not powered, according to an embodiment of the present invention.

In the illustrated embodiment, a USB device 620 comprises a USB device interface module 624, one or more device function module(s) 626, and a wakeup generation module 622. An internal bus 632 couples between device function module(s) 626 and USB device interface module 624. Optionally, there may be an interface 625 between wakeup generation module 622 and USB device interface module 624 (for example so that wakeup generation module 622 can pass wakeup requests or otherwise indicate detected wakeup conditions to USB device interface module 624 when required). A USB bus 651 is coupled between a USB host 690 and the USB device interface module 624. USB bus 651 includes at least power (e.g. Vbus) 650, ground, D+, and D− lines. When USB bus 651 is active or suspended, power is supplied by a USB power supply 680 to power line 650. A single-wire sideband 623 is provided between wakeup generation module 622 and host wakeup module 660 so that a wakeup signal can be transmitted on the single-wire sideband by wakeup generation module 622 to host wakeup module 660 when it is desired to wake up the USB bus from the non-powered state. Single-wire sideband 623 is shown separate from USB bus 651 in FIG. 6 since under the current USB standard, the USB bus does not include a wakeup line. However, embodiments of the invention envision the possibility of wakeup line 623 being included in a USB bus complying with a future standard.

Some of the embodiments of method 100 will now be briefly reviewed with reference to the illustrated embodiment in FIG. 6. In stage 102 wakeup generation module 622 detects an internal wakeup request 628 from device function module 626 or an external wakeup request 630. Stage 104 may optionally be executed by wakeup generation module 622. Assuming that in stage 106, a wakeup signal is generated by wakeup generation module 622, host wakeup module 660 detects the wakeup signal in stage 108. In stage 110, host wakeup module 660 transmits a power enable signal 668 to USB power supply 680. USB power supply 680 supplies power to power line 650, for example as appropriate for an active or suspended bus. Host wakeup module 660 optionally may also communicate a host wakeup signal 666 to USB host 690, for example once the voltage level has stabilized on power line 650, so that USB host 690 may ensure that the logic levels of the data lines on USB bus 651 are known. Refer above to the discussion of FIG. 1 for more details on embodiments of method 100.

Figure 7:
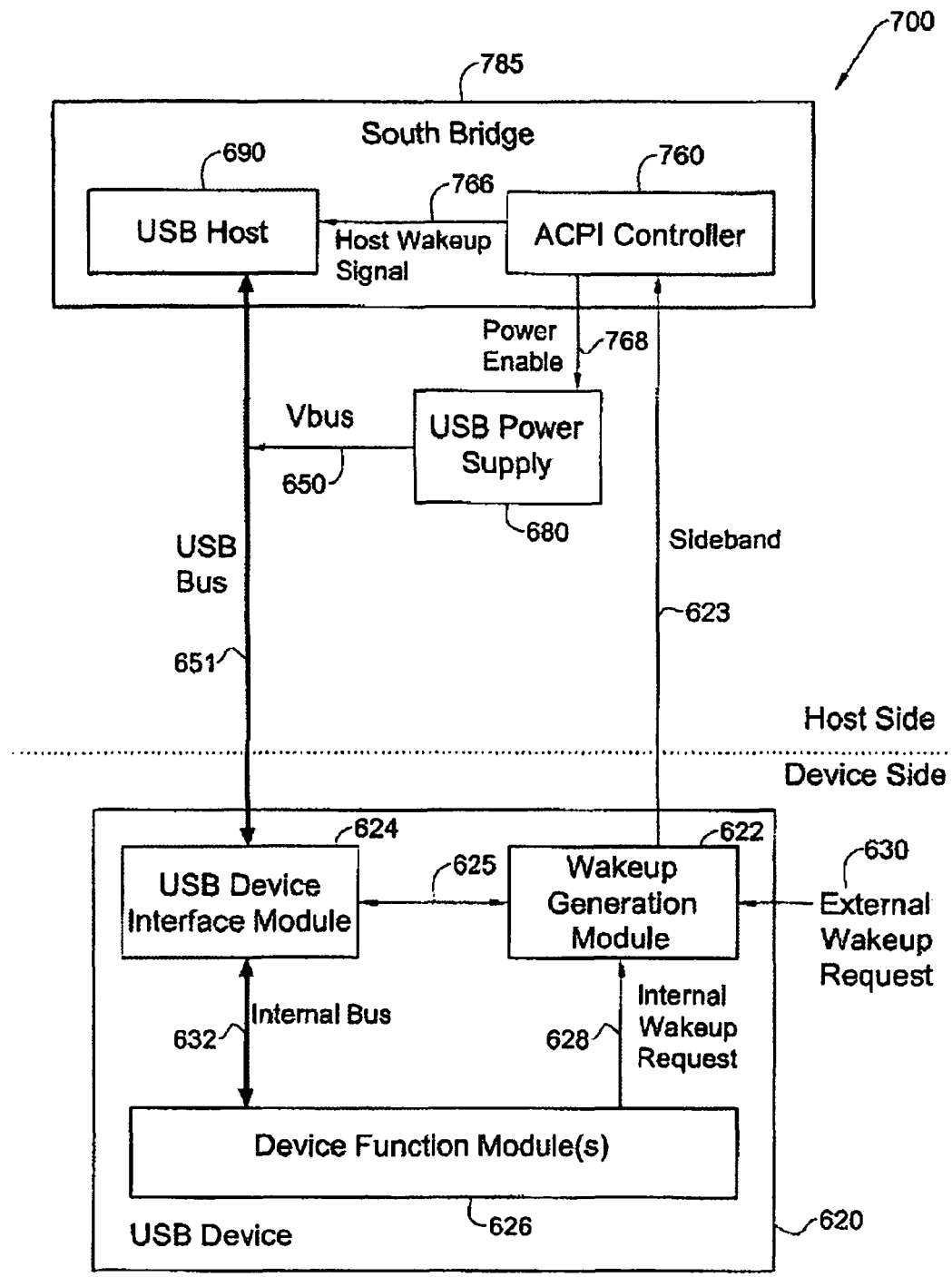
FIG. 7 is a block diagram of a system which illustrates one example of the system of FIG. 6, where the host wakeup module includes an ACPI controller, according to an embodiment of the present invention.

FIG. 7 is a block diagram of a system 700 which illustrates one example of system 600 of FIG. 6, where the host wakeup module includes an ACPI controller, according to an embodiment of the present invention. As mentioned above, the ACPI specification is an open industry standard that defines common interfaces for hardware recognition, motherboard and device configuration, and power management. In the embodiment illustrated in FIG. 7, the ACPI controller is configured to detect the sideband wakeup signal. Elements in FIG. 7 which are also shown in FIG. 6 are labeled with the same number.

In the illustrated embodiment, USB device 620 comprises USB device interface module 624, one or more device function module(s) 626, and wakeup generation module 622. Internal bus 632 couples between device function module(s) 626 and USB device interface module 624. Optionally, there is an interface 625 between wakeup generation module 622 and USB device interface module 624, USB bus 651 is coupled between USB host 690 which is located in the South Bridge 785 of the main system board of the electronic system and USB device interface module 624. USB bus 651 includes at least power (e.g. Vbus) 650, ground, D+, and D− lines. When USB bus 651 is active or suspended, the power is supplied by USB power supply 680 to power line 650. Single-wire sideband 623 is provided between wakeup generation module 622 and an ACPI controller 760 (an example of host wakeup module 660) so that a wakeup signal can be transmitted by wakeup generation module 622 to ACPI controller 760 via sideband 623 when it is desired to wake up the USB bus from the non-powered state. Single-wire sideband 623 is shown separate from USB bus 651 in FIG. 7 since under the current USB standard, the USB bus does not include a wakeup line. However, embodiments of the invention envision the possibility of wakeup line 623 being included in a USB bus complying with a future standard.

In the illustrated embodiment, ACPI controller 760 is located in South Bridge 785, for example because of the presence of USB host 690 in South Bridge 785 and the typical presence of power management functions in the South Bridge of the main system board. However in other embodiments, ACPI controller 760 may be located elsewhere.

Some of the embodiments of method 100 will now be briefly reviewed with reference to the illustrated embodiment in FIG. 7. In stage 102 wakeup generation module 622 detects an internal wakeup request 628 from device function module 626 or an external wakeup request 630. Stage 104 may optionally be executed by wakeup generation module 622. Assuming that in stage 106, a wakeup signal is generated by wakeup generation module 622, ACPI controller 760 detects the wakeup signal in stage 108. In stage 110, ACPI controller 760 transmits a power enable signal 768 to USB power supply 680. For example, in one embodiment, an ACPI compliant general purpose input wake events in ACPI controller 760 may detect the wakeup signal, and generate an interrupt to a Basic Input/Output System or operating system of ACPI controller 760 which services the interrupt and enables power via a general purpose output of ACPI controller 760. USB power supply 680 supplies power to power line 650, for example as appropriate for an active or suspended bus. ACPI controller 760 optionally may also communicate a host wakeup signal 766 to USB host 690, for example once the voltage level has stabilized on power line 650 and for example via a logical wakeup channel, so that USB host 690 may ensure that the logic levels of the data lines on USB bus 651 are known. In one embodiment, ACPI controller 760 uses interfaces defined in the ACPI specification to provide power enable signal 768 and optionally host wakeup signal 766 to USB power supply 680 and USB host 690 respectively. Refer above to the discussion of FIG. 1 for more details on embodiments of method 100.

Figure 8:
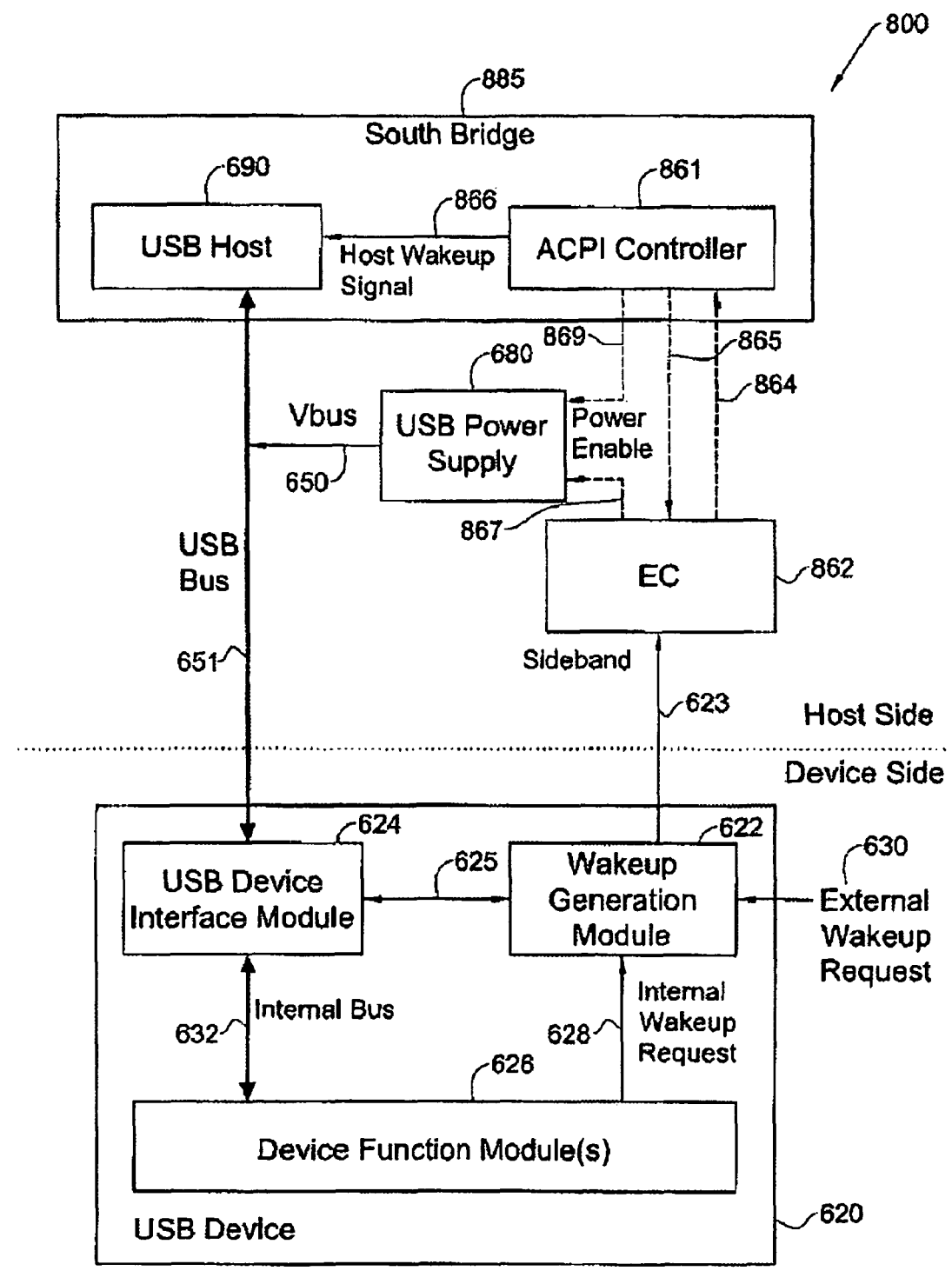
FIG. 8 is a block diagram of a system which illustrates one example of the system of FIG. 6, where the host wakeup module includes an embedded controller and an ACPI controller, according to an embodiment of the present invention.

FIG. 8 is a block diagram of a system 800 which illustrates one example of system 600 of FIG. 6, where the host wakeup module includes an embedded controller and an ACPI controller, according to an embodiment of the present invention. Elements in FIG. 8 which are also shown in FIG. 6 are labeled with the same number.

In the illustrated embodiment, USB device 620 comprises USB device interface module 624, one or more device function module(s) 626, and wakeup generation module 622. Internal bus 632 couples between device function module(s) 626, and USB device interface module 624. Optionally, there is an interface 625 between wakeup generation module 622 and USB device interface module 624. USB bus 651 is coupled between USB host 690 which is located in the South Bridge 885 of the main system board of the electronic system and USB device interface module 624. USB bus 651 includes at least power (Vbus) 650, ground, D+, and D− lines. When USB bus 651 is active or suspended, power is supplied by USB power supply 680 to power line 650.

In the illustrated embodiment, the host wakeup module comprises embedded controller 862 and an ACPI controller 861, and there is a communication channel between controllers 861 and 862. Embedded controller 862 and ACPI controller 861 may divide the functionality of the host wakeup module in any appropriate manner. For example, in the illustrated embodiment, single-wire sideband 623 is provided between wakeup generation module 622 and embedded controller 862 so that a wakeup signal can be transmitted by wakeup generation module 622 to embedded controller 862 when it is desired to wake up the USB bus from the non-powered state. However in other embodiments, the sideband wakeup signal may be routed additionally or alternatively to ACPI controller 861. As another example, embedded controller 862 and ACPI controller 861 may divide tasks in the host power up sequence differently depending on the embodiment. ACPI controller 861 is shown located in South Bridge 885, for example because of the presence of USB host 690 in South Bridge 885 and the typical presence of power management functions in the South Bridge of the main system board. However in other embodiments, ACPI controller 861 may be located elsewhere. Single-wire sideband 623 is shown separate from USB bus 651 in FIG. 8 since under the current USB standard, USB bus does not include a wakeup line. However, embodiments of the invention envision the possibility of wakeup line 623 being included in a USB bus complying with a future standard.

Some of the embodiments of method 100 will now be briefly reviewed with reference to the illustrated embodiment in FIG. 8. In stage 102 wakeup generation module 622 detects an internal wakeup request 628 from device function module 626 or an external wakeup request 630. Stage 104 may optionally be executed by wakeup generation module 622. Assuming that in stage 106, a wakeup signal is generated by wakeup generation module 622, the wakeup signal is detected in stage 108. In the illustrated embodiment, single-wire sideband 623 is routed to embedded controller 862, and therefore embedded controller 862 detects the wakeup signal in stage 108. However, in another embodiment single-wire sideband 623 may additionally or alternatively be routed to ACPI controller 861, and ACPI controller 861 may detect the wakeup signal. In stage 110, the host power up sequence is executed.

The participation by ACPI controller 861 and embedded controller 862 in the host power up sequence of stage 110 may vary depending on the embodiment and is not limited by the invention. However for the sake of further illustration, some embodiments are shown in FIG. 8. In these embodiments, it is assumed that embedded controller 862 detected the wakeup signal. In one of these embodiments, upon detection of the wakeup signal, embedded controller 862 communicates a signal 864 to ACPI controller 861 and ACPI controller 861 in turn transmits a power enable signal 869 to USB power supply 680. In another of these embodiments, upon detection of the wakeup signal, embedded controller 862 communicates a signal 864 to ACPI controller 861 and also transmits a power enable signal 867 to USB power supply 680. In another of these embodiments, upon detection of the wakeup signal, embedded controller 862 communicates a signal 864 to ACPI controller 861, waits for a response 865 from ACPI controller 861 and then transmits a power enable signal 867 to USB power supply 680. In these embodiments, once USB power supply 680 has been enabled, USB power supply 680 supplies power to power line 650, for example as appropriate for an active or suspended bus. ACPI controller 861 optionally may also communicate a host wakeup signal 866 to USB host 690, for example once the voltage level has stabilized on power line 650, so that USB host 690 may ensure that the logic levels of the data lines on the USB bus are known. In one embodiment, ACPI controller 861 uses interfaces defined in the ACPI specification when communicating with other modules in system 800. Refer above to the discussion of FIG. 1 for more details on embodiments of method 100.

The configurations presented above with reference to FIG. 2 to 8 are but a few examples of the possible configurations of systems for waking up a non-powered USB bus which are within the scope of this disclosure. Therefore, in some embodiments, method 100 or a variation thereof for waking up a non-powered USB bus may be executed by a system other than those described with reference to FIG. 2 to 8. For example, in an embodiment where the wakeup generation module is fully outside the USB device, the wakeup generation module may in some cases only receive external wakeup requests. As another example, the host wakeup module is not limited to the examples presented with reference to FIG. 2 to 8. Continuing with this example, method 100 or a variation thereof for waking up a USB bus which is not powered may in some cases be executed instead by a system where the host wakeup module includes dedicated power management "PM" (which controls power on logic), interrupt/event driven code, an embedded controller (without the ACPI controller), and/or any appropriate software, hardware and/or firmware, mutatis mutandis. For example, in one of these embodiments where the host wakeup module includes an embedded controller but excludes an ACPI controller, upon detecting a wakeup signal on the power line or on a single-line sideband, the embedded controller may directly enable the USB power supply. In this embodiment, the embedded controller optionally may also communicate a host wakeup signal to the USB host, for example once the voltage level has stabilized on the power line, so that USB host is ensured that the logic levels of the data lines on the USB bus are known. As another example, in one of these embodiments, where the host wakeup module includes dedicated power management, the power management may detect a wakeup signal on the power line or on a single-line sideband and then enable the power supply and optionally wake up the USB host. As another example, in one of these embodiments, where the host wakeup module includes interrupt and/or event driven code, a wakeup signal on the power line or on a single-line sideband may cause the execution of interrupt handler code for enabling the power supply and optionally waking up the USB host. As another example, in one of these embodiments, where the host wakeup module includes an SMC controller, the SMC controller may detect a wakeup signal on the power line or on a single-fine sideband and then enable the power supply and optionally wake up the USB host.

Some embodiments of the invention may include a system for waking up a non-powered USB bus that is based on a combination of two or more configurations presented in FIGS. 2 to 8. For example, in one of these embodiments, the system for wakeup may allow for a wakeup signal on the power line of the USB bus and on a single-wire sideband, either concurrently or at separate times.

In one embodiment, the ability to wake up the USB bus from a non-powered state may be advantageous in potentially allowing power consumption for an electronic system to be lowered. For example, assuming that power consumption is lower when the USB bus is not powered versus suspended, power consumption may be reduced if the USB bus is put into a non-powered state rather than into a suspended state because subsequent wakeup from a non-powered state is possible.

In one embodiment, the wakeup signal on a power line of the USB bus and/or on a single-wire sideband may be used additionally or alternatively to a wakeup signal on a System Management Bus "SMBus". In some cases, a wakeup signal on a power line of the USB bus and/or on a single-wire sideband may be advantageous over a wakeup signal on an SMBus because a wakeup signal on an SMBus may sometimes require the usage of an SMBus device associated with the USB device, the usage of dedicated firmware to route the wakeup signal over the SMBus, and/or the usage of at least two lines for wakeup.

In one embodiment, the wakeup signal over a power line of the USB bus and/or over a single-wire sideband may be used additionally or alternatively to a wakeup signal over D+ and/or D− data lines of the USB bus. In some cases, a wakeup signal over a power line of the USB bus and/or over a single-wire sideband may be advantageous over a wakeup signal via D+/D− data lines, because implementing a wakeup signal via D+/D− lines may sometimes require special design, simulation tools, and/or knowledge to modify the complex data lines input/output buffers (called PHY) which are designed and tuned for a specific fabrication line and process (e.g. 0.18u geometry and 5 metal layers).

Some embodiments for waking up the USB bus from a non-powered state using a wakeup signal on the power line of the USB bus and/or on single-wire sideband may not include the above stated advantages. Some of these embodiments may not include any advantages over conventional schemes for waking up the USB bus other than providing additional options for implementing wakeup in an electronic system. Alternatively or additionally, some of these embodiments may include other advantages apparent from the description above.

While the invention has been shown and described with respect to particular embodiments, it is not thus limited. Numerous modifications, changes and improvements within the scope of the invention will now occur to the reader.

The invention claimed is:

1. A method of waking up a USB bus from a non-powered state, comprising:
   upon detection of a wakeup condition, a wakeup generation module associated with a USB device generating a wakeup signal on a power line of a USB bus coupled to said USB device, and
   a host wakeup module detecting said wakeup signal and causing said USB bus that is coupled to said USB device to be supplied with power,
   wherein said wakeup signal includes a wakeup voltage that is distinguishable from a voltage which would be on said power line if said USB bus were in an active state or in a suspended state.

2. The method of claim 1, farther comprising: encoding said wakeup condition in said wakeup signal.

3. The method of claim 2, wherein said wakeup condition is encoded by usage of a corresponding toggling sequence, a corresponding voltage value, or a corresponding voltage range.

4. The method of claim 1, further comprising: receiving a wakeup request from within said USB device, wherein said wakeup condition is detected by way of said received wakeup request.

5. The method of claim 1, further comprising: receiving a wakeup request from outside said USB device, wherein said wakeup condition is detected by way of said received wakeup request.

6. A module for waking up a USB bus which is not powered, comprising:
   a wakeup generation module, associated with a USB device, configured upon detection of a wakeup condition, to generate a wakeup signal on a power line of a USB bus coupled to said associated USB device;
   wherein said wakeup signal when detected causes said USB bus to be supplied with power; and
   wherein said wakeup signal includes a wakeup voltage that is distinguishable from a voltage which would be on said power line if said USB bus were in an active state or in a suspended state.

7. The module of claim 6, further comprising:
   a preventing module configured to prevent at least one action selected from a group comprising: said wakeup signal on said power line reaching a USB device interface module of said associated USB device and said supplied power reaching said wakeup generation module.

8. The module of claim 7, wherein said preventing module includes at least one diode or switch.

9. The module of claim 6, wherein said associated USB device is included on a main system board.

10. The module of claim 6, wherein said associated USB device is a peripheral or included on an expansion card.

11. The module of claim 6, wherein said wakeup generation module is included in said associated USB device.

12. The module of claim 6, wherein said wakeup generation module is at least partially external to said associated USB device.

13. A host with wakeup capabilities, comprising:
   a USB power supply configured to supply or not supply power to a USB bus; and
   a host wakeup module, coupled to a power line of said USB bus, configured to detect a wakeup signal on said power line and configured to subsequently enable said USB power supply to supply power to said USB bus;
   wherein said wakeup signal includes a wakeup voltage that is distinguishable from a voltage which would be on said power line if said USB bus were in an active state or in a suspended state.

14. The host of claim 13, further comprising:
   a USB host, wherein said host wakeup module is further configured to communicate a host wakeup signal to said USB host, after detection of said wakeup signal.

15. The host of claim 13, wherein said host wakeup module includes at least one selected from a group comprising: an advanced configuration and power interface controller, an embedded controller, a system management controller, and dedicated power management.

16. The host of claim 13, wherein said USB bus whose power is supplied by said USB power supply is coupled to at least one USB device, further comprising:
   an inhibiting module on said power line configured to prevent said wakeup signal which is associated with one of said at least one USB device from reaching said power supply or any other of said at least one USB device.

17. The host of claim 16, wherein said inhibiting module includes at least one diode or switch.

18. The method of claim 1, wherein the wakeup generation module associated with the USB device determines whether or not the USB bus is in a non-powered state prior to generating the wakeup signal.

19. The module of claim 6, wherein the wakeup generation module associated with the USB device determines whether or not the USB bus is in a non-powered state prior to generating the wakeup signal.

20. The method of claim 1, further comprising: said USB bus, which is being supplied with power, supplying power to said USB device.

* * * * *